July 12, 1932. L. K. BRAREN 1,867,492
GEAR TRANSMISSION
Filed Nov. 25, 1929   2 Sheets-Sheet 2

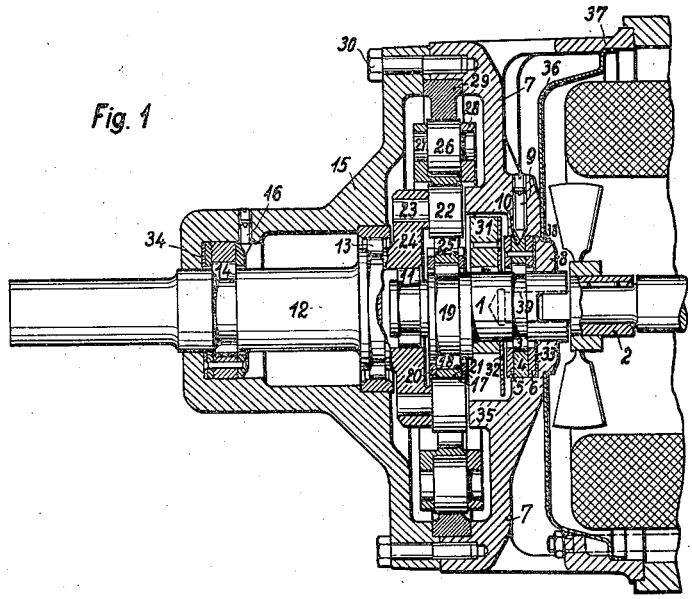

Inventor:
Lorenz Konrad Braren.

Patented July 12, 1932

1,867,492

UNITED STATES PATENT OFFICE

LORENZ KONRAD BRAREN, OF MUNICH, GERMANY

GEAR TRANSMISSION

Application filed November 25, 1929, Serial No. 409,719, and in Germany November 30, 1928.

The invention relates to gear transmissions and has for its object to provide a transmission with a fixed speed ratio of a very simple compact and durable form working with a high efficiency. This object is attained by arranging a roller carrying disc between the fast and slowly rotating member. This disc is coupled to rotate with the slow member and to move eccentrically with the fast member. The rollers carried by the disc engage with teeth of a stationary ring the contour of which is an hypocycloidal or hypotrochoidal curve. The rollers pass constantly through the lubricant contained in the lower part of the housing insuring thus a perfect cooling and lubrication.

A further object of my invention is to form the teeth to a slightly different cycloidal curve than the path in which the rollers are moving. This is done to have only those parts of the curve come in contact with the rollers where the load is transmitted with a good leverage—the length of the leverage for each roller varying through one revolution with the sine of the angle—and to bring at the same time the rollers very gradually in and out of contact with the curve.

The above and various other important improvements will be hereinafter fully described and claimed. In order that this my invention may be more readily understood reference is made to the accompanying sheets of drawings which show how the invention may be carried into practical effect.

Fig. 1 is a longitudinal section of a gear transmission according to my invention.

Fig. 2 is a cross section of the gear shown in Figure 1.

Figures 3, 5:
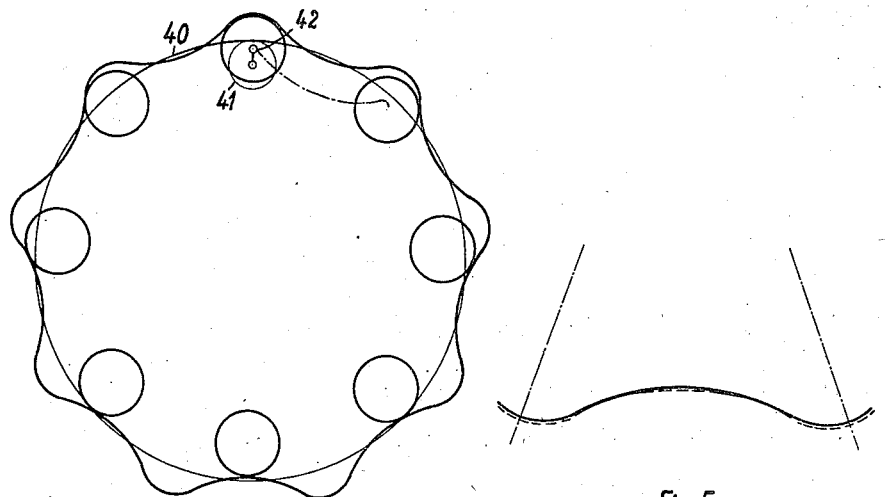
Fig. 3 shows a prolate outer hypotrochoid.
Fig. 5 shows a corrected hypocycloidal curve differing slightly from the path described by the rollers in relation to the curve.

Referring to the Figures 1 and 2 the fast rotating member 1 which may for instance be coupled to the shaft 2 of an electromotor is journaled on two sets of rollers 3 and 11 both running in recesses of the shaft 1. The rollers 3 are located in a bearing 4, two plates 5 and 6 riveted to the race holding the rollers in an axial direction. The bearing 4 centers in a bore of the housing 7 and is pressed axially against a shoulder 8 of this housing by a plurality of pintel screws 9 entering into corresponding slots 10 of the bearing 4. The second set of rollers 11 runs without axial restriction in a bore of the slowly rotating shaft 12 which latter is journaled in two roller bearings 13 and 14 located in the cover 15 of the housing 7. The bearing 14 is held axially in similar manner as the bearing 4 by a number of pintle screws 16 while the bearing 13 does not impose an axial restriction on the shaft 12. A disc 17 is mounted on a set of rollers 18 running between shoulders on an eccentric portion 19 of the shaft 1. Two plates 20 and 21 riveted to either side of the disc 17 hold the rollers 18 in axial position. A number of rollers 22 are mounted on evenly spaced pins 23 which are pressed into a flanged portion 24 of the shaft 12. These rollers are located in bores 25 of the disc 17. In order to not restrict the disc in its movements the diameters of the bores 25 exceed the diameters of the rollers by twice the throw of the eccentric portion 19. The disc 17 carries a second set of rollers 26 rotating on evenly spaced pins 27 which are pressed into corresponding holes of the disc 17. A plate 28 fastened to the disc 17 supports the free ends of the pins 27. A ring 29 is centered in a recess of the housing 7 while the cover 15 centers again on the ring. The cover holding screws 30 transmit the pressure through the ring 29 and hold it thus against rotation. The ring 29 has a number of internal tooth shaped projections in engagement with the rollers 26. The contour of these teeth will later on be described in detail.

Figures 4, 6:
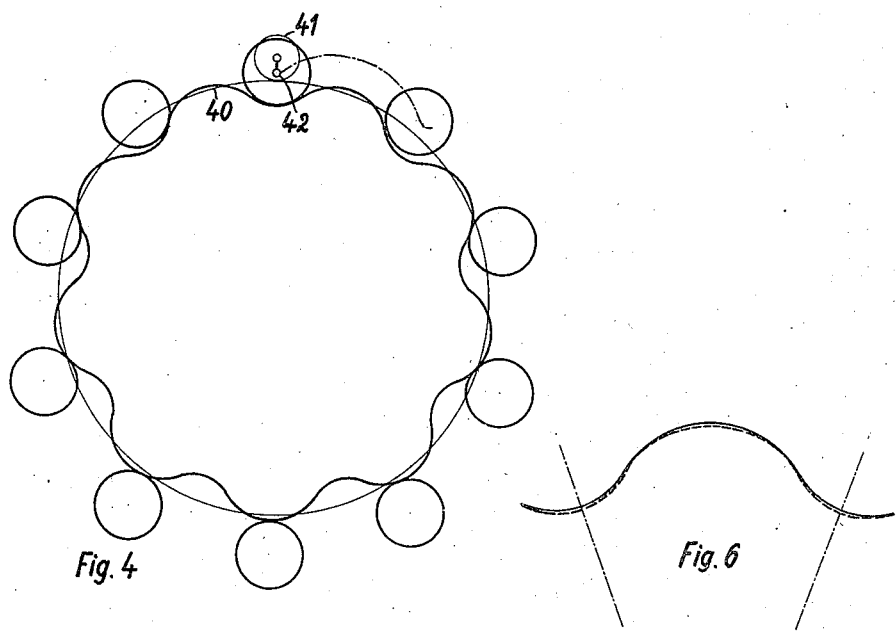
Fig. 4 is a prolate inner epitrochoid of the same general construction and for the same reduction as the curve in Figure 3.
Fig. 6 shows a similar correction for an epicycloidal curve.

The disc 17 and its contacting rollers 26 may be considered to be engaging means mounted on the eccentric portion 19 and engaging the tooth-like curve of the ring 29, which constitutes another engaging means. As is apparent from a comparison of Figs. 3 and 4, the parts may be reversed by placing the cycloidal curve on the disc 17 and the contacting rollers on the housing.

A counterweight 31 pressed onto the shaft 1 balances the parts moving eccentrically. A plate 32 is riveted to one side of the counterweight 31 in order to prevent an undue amount of lubricant to be thrown against the bearing 4 causing thus leakage past the bearing. In order to insure still further against possible leakage a thin plate 33 fitting closely over the shaft 1 and loosely in the bore of the housing 7 is placed in back of the bearing 4. A similar plate 34 is placed in back of the bearing 14. In order to prevent the rollers 22 from moving axially off the pins 23 there has been provided a circular ledge 35 on the housing 7.

These transmission gears are used to special advantage to reduce the high speeds of electromotors. For this purpose the housing 7 is constructed to connect at the other side directly to the frame of the electromotor saving thus one end shield. The bearing 4 supports the shaft of the rotor the coupling part 2 entering with a turned down portion 39 into a bore of the shaft 1. In order to be able to use the same housing 7 for open and also for closed motors there is provided a sheet metal plate 36 which in the first case is provided with openings for the cooling air to pass through. The plate 36 fits on its outer circumference into a recess 37 of the housing 7 and lays with its inner diameter against a ledge 38 of the hub of the housing. All parts serving as races for the rollers of course are preferably hardened and ground.

The rollers 26 on the disc 17 perform two movements: they once move bodily in a circular path according to the movement of the eccentric 19 with the angular velocity of the fast member 1 and they furthermore rotate slowly around the common axis of the shafts 1 and 12 with the angular velocity of the shaft 12. The combination of two rotative movements results in a cycloidal path. The contour of the teeth on the ring 29 therefor should, in order to insure a smooth operation even at high speeds, be shaped to the corresponding cycloidal curve. Theoretically this might be either an epicycloid or a hypocycloid but for practical reasons only a hypocycloid may be employed, otherwise the equidistant required by the diameter of the rollers would cut away a large portion of the tooth. The internal hypocycloid—under this designation is also always included the hypotrochoid form of the curve—has the advantage over an external epicycloid of the same construction for the identical ratio of reduction because the shape of the tooth is of greater stability and two less rollers are required for a given reduction. This may clearly be seen by comparing the Figures 3 and 4, where also the base circle 40, the rolling circle 41 and the generating point 42 for the trochoid form of the curve have been shown. On account of the more favourable conditions generally the prolate trochoid curve is used. The terms cycloid, cycloidal, trochoid, trochoidal, hypocycloid, etc., as used in this specification and in the claims, are intended, of course, to include also the equidistant of such curves and in practice the equidistants are generally used, as is apparent from the preceding description.

The transmission of load between the rollers and the curve must always be normal to the curve and operates therefor with a varying length of leverage on the disc 17. The greater the leverage of course the better must be the efficiency which becomes zero for a leverage of zero when the normal of the curve passes through the center. In order to eliminate these portions the curve is generated to a cycloidal curve differing slightly from the path described by the rollers in relation to the curve. Thus the rollers come very gradually in and out of engagement with the curve and only bear at the portion where the power is transmitted to best advantage. On the Figures 5 and 6 this correction is shown in greatly exaggerated form the dotted lines representing the corrected form of the curve. This measure of course applies to hypocycloidal curves as well as to epicycloids.

A method and means for producing the curves above mentioned is described in my copending application Serial No. 151,799 filed November 30, 1926, while the use of epicycloidal curves together with a stationary set of rollers is described in my patent specification No. 1,694,031.

Having now particularly described and ascertained the nature of my said invention I do not wish to be understood as limiting myself to the exact details of construction as obviously many modifications will occur to a person skilled in the art.

What I claim is:

1. In a gear transmission a fast rotating member, a slowly rotating member, an eccentric portion on said fast rotating member, a disc mounted rotatably on said eccentric portion, coupling means connecting said disc rotatably to said slowly rotating member, a set of engaging members on said disc, and a second set of stationary engaging members working together with said first set of engaging members, one set of said engaging members forming part of a prolate trochoidal curve differing slightly from the curve traced by the two sets of engaging members in relation to each other in that the actual curve is relieved by diverging gradually and smoothly from said traced curve adjacent the high and low points of the teeth thereof for disengaging said two sets of engaging members periodically during each revolution of said fast rotating member.

2. In a gear transmission, the combination with a fast rotating member, of a slowly rotating member, a transmission member, means operated by said fast rotating member for causing bodily rotation of said transmission member, guiding means cooperating with said transmission member to produce angular rotation of the transmission member in response to the bodily rotation thereof, and means connecting said transmission member to said slowly rotating member to rotate the latter in accordance with the angular rotation of the former, said guiding means consisting of two sets of engaging members of which one set is mounted on said transmission member and the other set is held stationary, one set of engaging members being in the shape of rollers and the other set forming part of a prolate hypotrochoidal curve differing slightly in form from the cycloid traced by these two sets of engaging members in relation to each other in that the actual curve is relieved by diverging gradually and smoothly from said traced curve adjacent the high and low points of the teeth thereof.

3. In a gear transmission, the combination with a fast rotating member, of a slowly rotating member, an eccentric portion on said fast rotating member, engaging means mounted to turn on said eccentric portion, other engaging means for cooperation with said first named engaging means, one of said engaging means comprising a plurality of spaced contact members, the other of said engaging means comprising a surface formed substantially on a tooth-like curve of generally prolate trochoidal form, said curve being substantially the shape of the theoretically correct prolate trochoidal curve at intermediate points of its teeth and diverging gradually and smoothly from such theoretical shape adjacent the high and low points of the teeth so that said contact members will engage said curve and react therewith substantially only at intermediate points of the teeth thereof and will move gradually and smoothly out of contact with said curve at the high and low points of the teeth thereof, and means operatively connecting the engaging means on the eccentric portion with said slowly rotating member.

4. In a gear transmission, the combination with a fast rotating member, of a slowly rotating member, an eccentric portion on said fast rotating member, engaging means mounted to turn on said eccentric portion, other engaging means for cooperation with said first named engaging means, one of said engaging means comprising a series of engaging means rollers, the other of said engaging means comprising a surface formed substantially on a tooth-like curve of generally prolate hypotrochoidal form, said curve being substantially the shape of the theoretically correct prolate hypotrochoidal curve at intermediate points of its teeth and diverging gradually and smoothly from such theoretical shape adjacent the high and low points of the teeth so that said rollers will engage said curve and react therewith substantially only at intermediate points of the teeth thereof and will move gradually and smoothly out of contact with said curve at the high and low points of the teeth thereof, and means operatively connecting the engaging means on the eccentric portion with said slowly rotating member.

5. In a gear transmission, the combination with a fast rotating member, of a slowly rotating member, an eccentric portion on said fast rotating member, engaging means mounted to turn on said eccentric portion, other engaging means for cooperation with said first named engaging means, one of said engaging means comprising a plurality of spaced contact members, the other of said engaging means comprising a surface formed substantially on a smooth continuous tooth-like curve of generally prolate trochoidal form, said curve being substantially the shape of the theoretically correct prolate trochoidal curve at intermediate points of its teeth and diverging gradually and smoothly from such theoretical shape adjacent the high and low points of the teeth so that said contact members will engage said curve and react therewith substantially only at intermediate points of the teeth thereof and will move gradually and smoothly out of contact with said curve at the high and low points of the teeth thereof, and means operatively connecting the engaging means on the eccentric portion with said slowly rotating member.

6. In a gear transmission, the combination with a fast rotating member, of a slowly rotating member, an eccentric portion on said fast rotating member, engaging means mounted to turn on said eccentric portion, other engaging means for cooperation with said first named engaging means, one of said engaging means comprising a plurality of engaging means, the other of said spaced contact members, the other of said engaging means comprising a surface formed substantially on a smooth continuous tooth-like curve of generally prolate hypotrochoidal form, said curve differing from a theoretically correct prolate hypotrochoidal curve by gradually and smoothly diverging therefrom adjacent the high and low points of the teeth thereof so that said contact members will engage said curve and react therewith substantially only at intermediate points of the teeth thereof and will be substantially out of contact with said curve at said high and low points, and means operatively connecting the engaging means on the eccentric portion with said slowly rotating member.

7. In a gear transmission, the combination with a fast rotating member, of a slowly rotating member, an eccentric portion on said fast rotating member, engaging means mounted to turn on said eccentric portion, other engaging means for cooperation with said first named engaging means, one of said engaging means comprising a plurality of spaced contact members, the other of said engaging means comprising a surface formed substantially on a smooth continuous tooth-like curve of generally prolate trochoidal form, said curve being substantially the shape of the theoretically correct prolate trochoidal curve at intermediate points of its teeth and diverging gradually and smoothly from such theoretical shape adjacent the high and low points of the teeth so that said contact members will engage said curve and react therewith substantially only at intermediate points of the teeth thereof and will move gradually and smoothly out of contact with said curve at the high and low points of the teeth thereof, and means operatively connecting the engaging means on the eccentric portion with said slowly rotating member.

8. In a gear transmission, the combination with a fast rotating member, of a slowly rotating member, an eccentric portion on said fast rotating member, engaging means mounted to turn on said eccentric portion, other engaging means for cooperation with said first named engaging means, one of said engaging means comprising a series of rollers, the other of said engaging means comprising a smooth continuous tooth-like curve of the general form of an equidistant of a prolate trochoid, said curve differing from a theoretically correct equidistant of a prolate trochoid by gradually and smoothly diverging therefrom adjacent the high and low points of the teeth thereof so that said rollers will engage said curve and react therewith substantially only at intermediate points of the teeth thereof and will be substantially out of contact with said curve at said high and low points, and means operatively connecting the engaging means on the eccentric portion with said slowly rotating member.

In testimony whereof I hereunto affix my signature.

LORENZ KONRAD BRAREN.